Dec. 6, 1949   G. W. BRYAN, JR   2,490,025
RECEIVER SYSTEM
Filed March 29, 1944   2 Sheets-Sheet 1
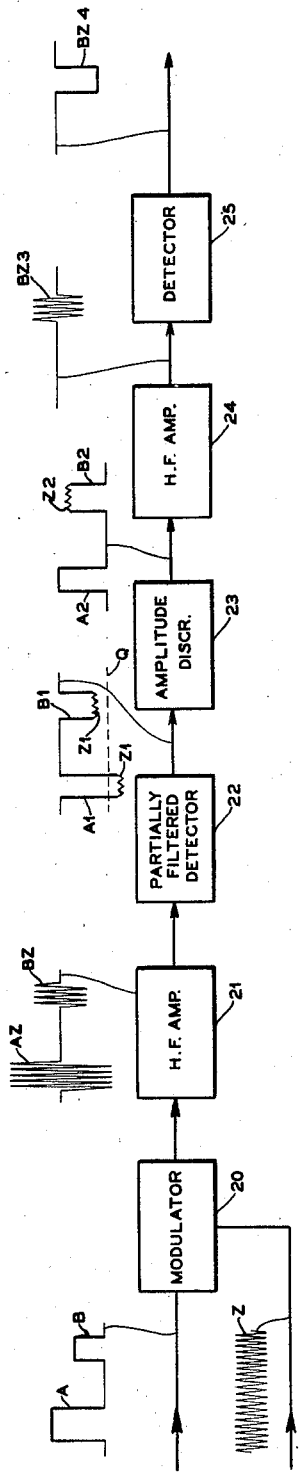
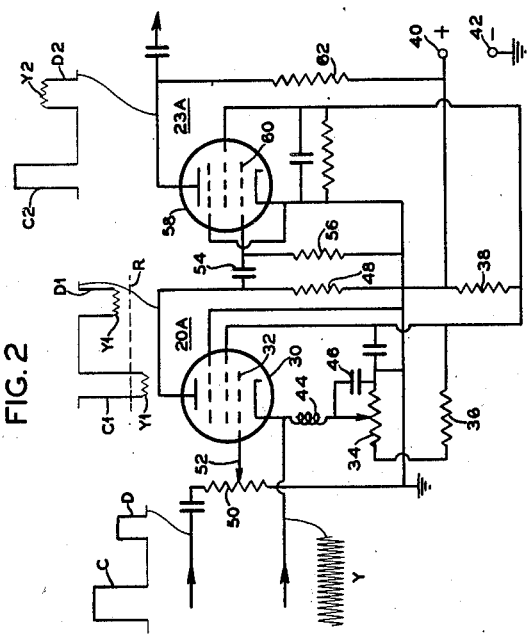
INVENTOR.
GEORGE W. BRYAN, JR.
BY
*William D Hall*
ATTORNEY.

Dec. 6, 1949 G. W. BRYAN, JR 2,490,025
RECEIVER SYSTEM
Filed March 29, 1944 2 Sheets-Sheet 2
FIG. 4
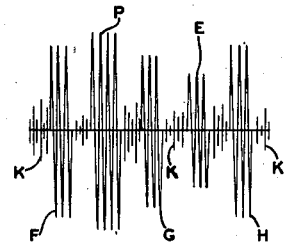
FIG. 5
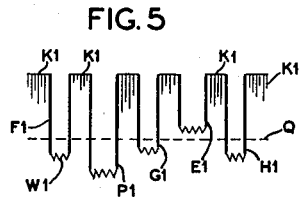
FIG. 6
FIG. 7
FIG. 8
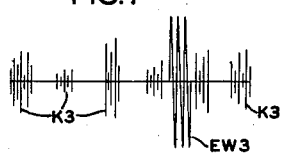
FIG. 9
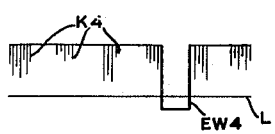
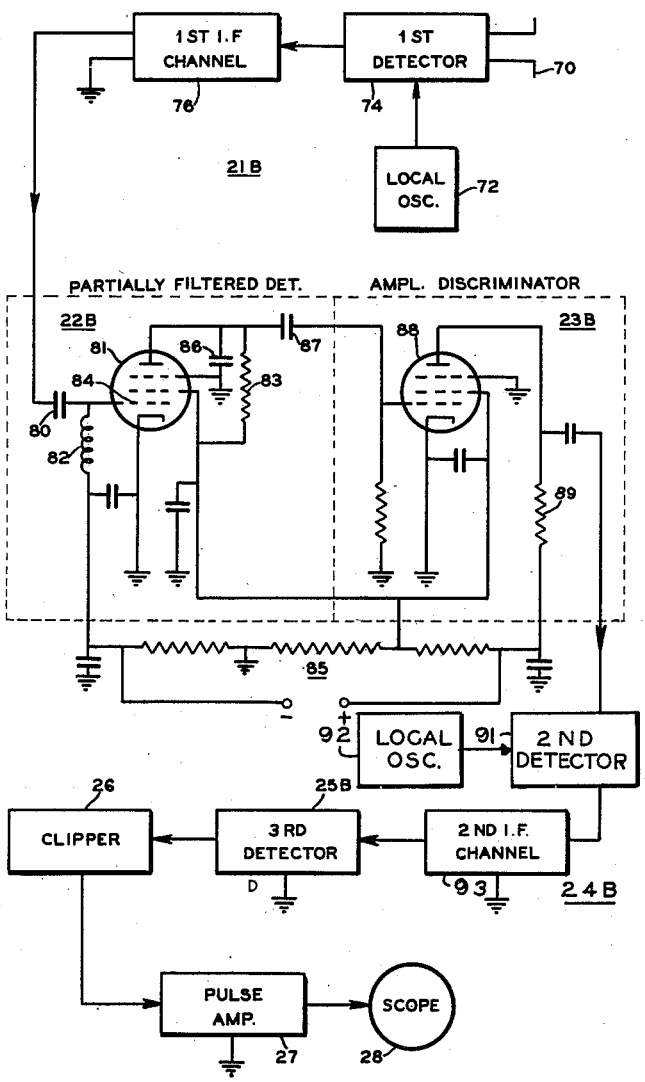
FIG. 3
*INVENTOR.*
GEORGE W. BRYAN, JR.
BY
William D. Hall
*ATTORNEY.*

Patented Dec. 6, 1949

2,490,025

UNITED STATES PATENT OFFICE 2,490,025

RECEIVER SYSTEM

George W. Bryan, Jr., Belmar, N. J.

Application March 29, 1944, Serial No. 528,545

13 Claims. (Cl. 250—20)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to means and methods for discriminating between potentials of different amplitudes, particularly of the type which cause interference in equipment used in pulse-echo object detection systems; although the invention is equally applicable to other systems using similar types of signals.

In conventional pulse-echo object detection systems, pulses of radio frequency energy, in the form of discrete wave trains of fixed frequency, are intermittently transmitted at intervals which are relatively large compared to the duration of said wave trains. On striking a target, said pulses are reflected and received, and the time interval between the transmitted and received pulses is measured to determine the distance of said target. For measuring purposes both the transmitted signals and the received echoes are used to vertically deflect the beam of an oscilloscope, the horizontal trace of which is formed by means of a saw-tooth voltage synchronized with the transmitted pulses. Instead of deflecting the beam, the signals can be used to vary the intensity of the beam so that they would be indicated as a variation in brightness of the trace; or both methods may be combined. The distance between the two indications on the oscilloscope trace is a measure of the distance of the reflecting object.

In order to provide for accurate measurement, particularly at short distances, said wave trains must be of extremely short duration. To obtain accurate definition of the sharp pulses generated in such systems, it is necessary to use receivers having wide-band channels, since the width of the side-bands generated is an inverse function of the pulse duration. This feature causes considerable interference when a plurality of other units, operating on nearby frequencies which are within the pass-band of said channels, are located in the same area. Since such other units are usually not pulsed synchronously, this gives rise to a plurality of pulse images, commonly known as "railings," which continuously move on the oscilloscope screen, causing considerable difficulty in keeping track of the desired echoes and resulting in quick fatigue of the operating personnel. Wide-band channels also facilitate deliberate jamming through the use of frequency modulated or amplitude modulated signals which are within the acceptance band of said channels. Furthermore, the band-pass necessary for maximum definition of sharp pulses is often considerably wider than the band-pass required for optimum signal-to-noise ratio, so that the echo signals are further obscured by noise currents originating both inside and outside the receiver.

Moreover, because of the relative weakness of the echoes, the receiver must be made extremely sensitive, rendering it subject to saturation, or "knockdown," by the strong transmitted pulses. In spite of the protective spark-gap networks which are usually inserted ahead of the receiver, the currents which get into the receiver, especially in the later stages thereof, due to said transmitted pulses, as well as those due to "railings," are usually of greater amplitude than the echoes. Such large amplitudes cause large bias potentials to be developed upon the receiver tube electrodes, which potentials cannot be dissipated rapidly enough by the R-C networks associated with said receiver tubes. As a result, the receiver circuits are rendered incapable of transmitting any echoes which closely follow the types of high amplitude signals above-mentioned.

It is a main object of this invention to provide a circuit which will effectively transmit potentials below a predetermined amplitude, and reduce or completely reject potentials above said predetermined amplitude. Another object is to provide a circuit which will effectively transmit potentials within a predetermined amplitude range and attenuate or reject potentials outside said range. Still another object is to apply such circuits to pulse modulation receivers in order to reduce the effects of interfering signals.

The above objects are attained by superimposing on the varying amplitude potentials, preferably on the crests thereof, a small high-frequency component having an amplitude which is a small fraction of the amplitudes of said potentials. The resultant potentials are applied to the grid of a tube; said grid being so biased that potentials above a predetermined amplitude will drive said tube beyond one of the bends of its grid voltage-plate current characteristic, e. g., to plate-current cutoff, before the crest of each potential is reached. As a result, the high-frequency component on the crests of said potentials does not appear in the tube output. Since potentials below said predetermined amplitude do not drive the tube to plate-current cutoff, the high-frequency component on the crest of said lower amplitude potentials is transmitted by said tube. The high-frequency output of the latter is now emphasized by an amplifier tuned to the frequency of said output and then detected to derive envelopes of the high-frequency component of said lower amplitude potentials. The latter can now be passed through a conventional clipper circuit which will reject potentials and/or noise currents below a predetermined amplitude.

In a pulse-echo receiver, the pulses are already modulated by a high-frequency carrier. It is therefore only necessary to pass said modulated pulses through a partially-filtered detector which yields a resultant pulse envelope with a portion of the carrier superimposed thereon. The resultant pulses are then handled in the manner above described.

For a better understanding of the invention, together with other and further objects thereof, reference is had to the following description taken in connection with the accompanying drawings, wherein like parts are indicated by like symbols, and its scope will be pointed out in the accompanying claims.

In the accompanying drawings:

Figure 1 is a block diagram of my invention;

Figure 2 is a schematic circuit of a modification of my invention;

Figure 3 is a schematic circuit diagram of my invention as applied to a radio pulse receiver; and Figures 4 through 9 are theoretical diagrams illustrating the operation of the circuit in Figure 3.

Referring to Figure 1, there is shown a system for discriminating between pulses of different amplitudes, such as A and B. Such pulses are impressed on a modulator 20 upon which is also impressed a relatively high frequency (H. F.) potential Z, having a period which is relatively small compared to the duration of each pulse. Modulator 20 is normally biased at or below cutoff so that normally there is no H. F. component in its output. Pulses A and B will render the modulator increasingly conducting, so that its output will contain pulse modulated H. F. pulses or wave trains AZ and BZ, corresponding in amplitude to pulses A and B, respectively.

The H. F. output of modulator 20 is now, if desired, amplified by an amplifier 21, tuned to the frequency of said H. F. potential Z, and impressed upon a partially-filtered detector 22, hereinafter described in greater detail. This detector will yield negative-going pulses A1 and B1, corresponding in amplitude to wave trains AZ and BZ, respectively. Because the detector 22 is partially filtered, a small H. F. component Z1 will ride on the crest portion of pulses A1 and B1.

The output of detector 22 is now impressed upon the grid circuit of an amplitude discriminator 3, which is essentially a vacuum tube with its grid so biased that negative-going pulses, such as A1, which are above a predetermined amplitude represented by dotted line Q, will drive said grid to plate-current cutoff, while pulses such as B1, which are below said amplitude, will not drive said grid to cutoff. As a result, H. F. component Z1 on pulse A1 will not appear in the output of said tube, while said H. F. component of pulse B1 will get through.

The output of amplitude discriminator 23 will therefore contain a pulse A2 without any H. F. component thereon, and a pulse B2 with H. F. component Z2 on the crest thereof. Component Z2 may, if desired, be further amplified by H. F. amplifier 24 tuned to the frequency thereof or to a harmonic of said frequency. This amplifier rejects pulse components A2 and B2, and yields a wave train BZ3, representing the amplified component Z2. Wave train BZ3 is then detected by a conventional detector 25 which yields the envelope BZ4 of wave train BZ3. Thus, from an original pair of input pulses A and B of different amplitudes, only a single pulse BZ4, derived from smaller amplitude pulse B, appears in the output.

Figure 2 illustrates a simplified version of the system above described. This version includes a mixer 20A, comprising a pentode 30, which may be of the 6SJ7 type, and which has its cathode normally biased positive with respect to its grid 32, by means of a potential drop across a portion of potentiometer 34 connected in series with fixed resistors 36 and 38 across the terminals 40 and 42 of a plate voltage source. A small H. F. potential Y is impressed across a choke 44 in the cathode circuit, which choke may be tuned to the frequency of potential Y. A bypass condenser 46 provides a low impedance path to ground for H. F. potential Y. By adjusting the slider of potentiometer 34, the negative bias is made high enough to bias the grid sufficiently below plate-current cutoff so that H. F. potential Y does not normally appear across the output resistor 48 of tube 30.

Positive-going pulses C and D, having different amplitudes, are impressed across a potentiometer 50. A selected portion of the pulse input, as determined by the setting of slider 52, is impressed on the grid 32. Slider 52 is so adjusted that the positive-going pulses render the grid sufficiently positive to overcome the cutoff bias and render the tube conducting. If the amplitudes of pulses C and D are made large compared to the amplitude of H. F. potential Y, the resultant potentials across output resistor 48 will be in the form of negative-going pulses C1 and D1 (due to phase inversion by the tube) with a small H. F. modulation component Y1 riding on the crests thereof.

Resultant pulses C1 and D1 are impressed, through condenser 54 of low impedance to all pulse components, upon the input resistor 56 of an amplitude discriminating circuit 23A, corresponding to component 23 in Figure 1. Circuit 23A includes a pentode tube 58, preferably of the sharp cutoff type such as type 6AC7, having its grid 60 normally biased at zero or slightly negative potential so that it is normally conducting. A negative-going pulse such as C1, which is above a predetermined amplitude such as represented by line R, will drive grid 60 sufficiently negative to bias tube 58 to plate current cutoff. As a result, the H. F. component Y1 will not appear across output resistor 62 of tube 58, as shown by pulse C2, while pulse D1, which has an amplitude less than R, will appear across resistor 36 as a pulse D2 together with its H. F. component Y2. Component Y2 can now be amplified and detected by elements such as 24 and 25 in Figure 1.

The suppressor grids of tubes 30 and 58 are connected to ground, as shown. The screen grids are connected to the plate-supply source through a voltage dropping resistor 38.

Reference is now made to Figure 3, which shows the above-described expedients applied to reduce the effects of interference and other undesirable potentials in a pulse-modulated carrier receiver, such as that of a pulse-echo object detection system. Said receiver is usually of superheterodyne type and comprises a conventional carrier channel 21B, including a directive antenna array 70, the carrier output of which is mixed with the output of a local oscillator 72 in a first detector 74 to derive an immediate frequency (I. F.) carrier which is amplified by a first intermediate frequency amplifier channel 76.

In a conventional receiver system, the signals in the output of I. F. channel 76 are detected to derive the signal envelopes which, in the case of a pulse-echo system, are in the form of pulses. Said pulses are then amplified in a video pulse amplifier 27, and then used to control the beam of an oscilloscope 28 to provide indications which may be interpreted, by means well known in the art, to locate a reflecting object.

However, for reasons above mentioned, interfering signals and noise will appear on the oscilloscope screen together with the echo signals, and will make interpretation of the echoes difficult. This will be evident from an examination of Figure 4 which is a simplified representation, on an exaggerated scale, of signals which may be present in the output of I. F. amplifier 76 during one cycle of the oscilloscope sweep. Pulse-modulated wave trains P and E represent the main transmitted pulses and the echo pulses, respectively. Wave trains F, G, and H represent interfering signals of the "railings" type, which are rarely, if ever, synchronized with the transmitted pulses and therefore move back and forth relative to the other signals so that they intermittently coincide with, and thus obscure, the desired echo signals E. Signals P, F, G, and H are almost always of much greater amplitude than the echoes E, and cause saturation (or "knockdown") of the receiver as above explained. In addition, there appear signals such as K, which may be considered as representing noise currents, originating both inside and outside the receiver, and interference due to continuous waves, which may be either unmodulated or modulated in amplitude or frequency.

All the above interfering currents can be reduced or eliminated by applying to the receiver system the expedients above described in connection with Figures 1 and 2. Thus, the output of I. F. amplifier 76 is applied, through a condenser 80 of low impedance to the I. F. currents, to a partially-filtered second detector 22B, comprising a pentode 81, preferably of the 6SJ7 type, having a tuned grid circuit 82 and an output resistor 83. The input grid 84 is biased about 6 volts negatively with respect to the cathode, so that it operates on the lower bend of its grid voltage-plate current characteristic. Plate and screen potentials are derived from a potentiometer network 85. The suppressor grid is grounded as shown.

This detector is conventional except in the following respect: Ordinarily there is used an I. F. bypass condenser 86, which is large enough to bypass substantially all the I. F. carrier components, so that only the pulse-modulation envelope appears across load resistor 83. In the present case, however, condenser 64 is of higher impedance so that a portion of the I. F. carrier component appears across load resistor 83, superimposed on the pulse envelope.

The term partially-filtered detector as applied to the detector 22B will now be clear from the above description. As used in the specification and claims the term partially-filtered detector is defined as a detector in which the carrier component is not completely by-passed, so that a portion of the carrier component remains superimposed on the pulse or modulation envelope.

The output across load resistor 83 is illustrated in Figure 5. In this figure, as well as in Figures 6–9, all signals which are developed in the succeeding circuits from original signals P, E, F, G, H, and K, are designated by the same letters and differentiated by different numerical subscripts. Thus, pulses P1 and E1, in Figure 5, are derived from signals P and E in Figure 4, etc. As is shown in Figure 5, the rectifying action of detector 22B results in negative-going pulse envelopes with a small I. F. carrier component W1 riding on the crest of each pulse envelope. Said I. F. component should preferably have an amplitude which is about 10% of the pulse amplitude.

The pulses across resistor 83 are now impressed, through a low impedance blocking condenser 87, upon the input grid of a pentode tube 88 of an amplitude discriminator 23B, which is substantially similar in structure and operation to component 23A in Figure 2. As a result, pulses such as P1, F1, G1, and H1, which have an amplitude higher than a predetermined amplitude, such as indicated by dotted line Q, will drive the grid of tube 88 to plate-current cutoff before said pulses reach their maximum amplitude, so that the I. F. component on the grid of said pulses will not appear across the output resistor 89 of tube 88.

The resultant potentials across output resistor 89 are shown in Figure 6. It will be seen that pulses P2, F2, G2, and H2 have no I. F. components superimposed thereon, while echo pulse E2 still has an I. F. component W2 thereon, since it is derived from signal E1 which has a lower amplitude level than that indicated by line Q.

By providing means to vary the bias on the input grid of tube 88, the plate-current cutoff level, represented by line Q, can be adjusted so that any desired signal level can reach into the cutoff region. A preferable method, however, is to leave the bias fixed, and determine the signal levels which reach into the cutoff region by merely adjusting the gain control associated with the first carrier channel 21B. The voltages across resistor 89 are now impressed, through a blocking condenser of low impedance to the I. F. component W2, upon a second I. F. amplifier channel 24B, which amplifies said I. F. component but does not transmit the pulse components. The signals in the output of amplifier 24B are shown in Figure 7. Since there is no I. F. component on pulses P2, F2, G2, and H2, no output representing these signals appears in the output circuit of amplifier 24B. But the I. F. component W2 of pulse E2 is amplified and appears as a pulse modulated I. F. signal EW3. Noise and amplitude modulated carrier signals K3 still appear in the output, however, if the amplitudes thereof are below the level indicated by line Q. (Figure 5.)

The output of the second I. F. amplifier 24B is now detected in a third detector 25B, of conventional design, which yields the pulse envelopes EW4 of all the I. F. signals, as indicated in Figure 8. If it is desired to eliminate all the lower amplitude noise and interference components K4, the output of detector 25B can be passed through a conventional clipper circuit 26 which will pass only signals above a predetermined amplitude level, such as indicated by line L, in Figure 8. The output of clipper 26 can now be inverted and/or amplified in a video pulse amplifier 27 to yield a signal such as EW5 in Figure 9, and then impressed on oscilloscope 28.

It will be obvious that the system in Figure 3 is similar to that in Figure 1. In the latter the pulses are first mixed with a high frequency component in a modulator 20. The resultant modulated pulses are then applied to an amplifier 21 tuned to said high frequency component. In Figure 3, the mixing process is not necessary since that is done in the pulse transmitter (not shown) of the pulse-echo system. The waves received by the antenna are therefore handled in a carrier channel 21B, which is the equivalent of channel 21 in Figure 1. Similarly, I. F. channel 24B in Figure 3 is the equivalent of channel 24 in Figure 1.

Although the operation of the above circuits has been illustrated in connection with discrete square pulses, it should be understood that the same techniques can be used with other wave shapes. In general, the more sharply rising the pulses handled, the better the circuits perform.

The system in Figure 3 is capable of several modes of operation depending upon the variety and extent of interference present. As above pointed out, the carrier channel 21B should have a band-pass wide enough to pass the entire sideband of the pulse modulated carrier in order to get faithful resolution of the desired echo-pulse signals. The narrower the pulses, the wider the side-band produced. The band-pass of both carrier channels 21B and 24B should, therefore, be at least as wide as is necessary to accommodate the side-band spectrum of the desired pulse echoes.

However, a band-pass wide enough to provide good resolution of the desired pulses is usually wider than that required for maximum signal-to-noise ratio. If noise is excessive, it can be reduced by narrowing the band-pass of the carrier channel, but if this is done in the first I. F. channel 21B, as would be the case in a conventional receiver, it would result in a distortion or widening of the pulses in the channel output, causing difficulty in distinguishing closely spaced echoes from each other and aggravating the effects of interfering pulses. It also reduces the accuracy with which the distance of an echo-producing body can be determined.

These difficulties can be considerably reduced in the system shown in Figure 3, by making the band-pass of channel 24B narrower than that of channel 21B. Thus the band-pass of channel 21B can be made wide enough to provide for maximum resolution of the desired pulse echoes, while the band-pass of channel 24B will be just wide enough for optimum signal-to-noise ratio, or said band-pass can be made even narrower than that necessary to obtain maximum signal-to-noise ratio if it is desired to eliminate strong adjacent channel interference of the continuous wave type. This may distort the desired pulses somewhat, but the result will not be so serious since all large amplitude interference components, such as "railings," are not present in channel 24B and therefore cannot obscure the desired echoes.

To facilitate the design of a narrow band channel, the frequency of the I. F. output of network 23B can be changed, by means of an additional heterodyne converter or second detector 91 and local oscillator 92, to a lower frequency to which the second I. F. amplifier of channel 93 can be tuned. The second detector 91, local oscillator 92, and second I. F. amplifier 93 constitute a second I. F. channel 24B.

Another mode of operation is necessary when it is desired to eliminate the effects of interfering pulses, or "railings," which are of much shorter duration and greater amplitude than the desired echo pulses, and the interval between the interfering pulses is very small, e. g., the space-to-mark ratio is unity or less. If the band-width of the carrier channel 21B is just adequate to provide good resolution of the desired echo pulses, said band-width will be insufficient to adequately resolve the narrower interfering pulses. As a result, the latter pulses will be widened so that they tend to cover up the spaces therebetween and completely cover the desired pulses.

To reduce this effect, the first carrier channel 21B should have a wide enough band-pass to adequately resolve the narrowest interfering pulses to be handled. This will result in a noise band-width which will be much larger than in a channel which would be just wide enough to resolve the desired wider pulses. However, by making the band-pass of channel 24B just wide enough to adequately resolve the wider echo pulses, the additional noise currents passed by channel 21B can be eliminated. Since the interfering pulses will be blanked out by circuit 23B due to their larger amplitude, the desired wider pulses in the output of channel 24B can be observed between the spaces represented by the blanked-out interfering pulses.

To permit selection of the various modes of operation above described, channels 21B and 24B should have variable selectivity control means to permit adjustment of the effective band-widths of said channels.

Although blanking of high amplitude signals has been accomplished by deriving a negative-going pulse envelope from partially-filtered detector 22B, and then using said envelope to drive the grid of tube 88 in amplitude discriminator 23B to plate-current cut-off, the same result can be obtained with positive-going envelopes by causing the latter to drive said tube beyond the upper bend of its plate current characteristic, i. e., to saturation.

While there has been described what is at present considered a preferred embodiment of the invention, it will be obvious to those skilled in the art that various changes and modifications may be made therein without departing from the invention, and it is, therefore, aimed in the appended claims, to cover all such changes and modifications as fall within the true spirit and scope of the invention.

I claim:

1. The method of discriminating between electrical pulses of different amplitudes which comprises superimposing on said pulses an electrical wave component having a period considerably smaller than the duration of said pulses and having an amplitude which is a minor fraction of the amplitude of said pulses, extracting the wave component of only those pulses which are below a predetermined amplitude, and amplifying and detecting said extracted wave component to derive resultant signals in response to the smaller pulses.

2. The method of discriminating between incoming modulated carrier waves of different amplitudes which comprises deriving from said waves the envelopes thereof and a small component of the incoming carrier frequency waves superimposed on said envelopes, extracting from said derived envelopes the carrier frequency component of only those envelopes which are below a predetermined amplitude, and detecting said extracted carrier frequency components to derive resultant signals.

3. The method of discriminating between incoming pulse modulated carrier waves of different amplitudes which comprises deriving from said waves the pulse envelopes thereof and a small component of the incoming carrier frequency waves superimposed on said envelopes, extracting from said derived pulse envelopes only the carrier frequency component of those envelopes which are below a predetermined amplitude, and amplifying and detecting said extracted carrier frequency components to derive resultant signals.

4. The method of discriminating between incoming pulse modulated radio frequency carrier waves of different amplitudes which comprises detecting and partially bypassing said waves to derive the pulse envelopes thereof and a small component of the incoming carrier frequency waves superimposed on the crest of said envelopes, extracting from said derived pulse envelopes the carrier frequency component of only those envelopes which are below a predetermined amplitude, amplifying and detecting said extracted carrier frequency components to derive resultant signals, and selecting from said resultant signals only those above a predetermined amplitude.

5. An amplitude discriminating receiver system for incoming modulated carrier waves which comprises a detector for deriving from said waves the modulation envelopes thereof, means for superimposing on said envelopes a portion of said incoming carrier waves which is of substantially smaller amplitude than said envelopes to form a resultant wave, a grid-controlled electron tube having its grid excited by said resultant wave, the bias on at least the grid of said tube being such that envelopes above a predetermined amplitude will drive said tube beyond at least one of the bends of its grid voltage-plate current characteristic whereby a smaller portion of the carrier component on modulation envelopes which are above said predetermined amplitude will be transmitted by said tube, and means responsive to said carrier component coupled to said tube.

6. An amplitude discriminating network for incoming pulse modulated carrier waves which comprises means for deriving pulse envelopes of said waves with a small component of said incoming carrier frequency waves superimposed on the crest thereof, a sharp cutoff electron tube having input and output electrodes and having its input electrode excited by the voltage output of said means, the bias on at least one of said electrodes being such that pulse envelopes above a predetermined amplitude will drive said tube beyond one of the bends of its input electrode voltage with respect to its output electrode current characteristic, whereby the carrier component of said pulse envelopes which are above said predetermined amplitude will be more effectively attenuated by said tube, filtering means for selecting the carrier component from the output of said tube, and an additional detector coupled to the output electrode of said tube.

7. An amplitude discriminating network for pulse modulated carrier waves which comprises a detector excited by said waves having means for only incompletely removing the carrier component of said waves for deriving negative-going pulse envelopes of said waves and a small carrier frequency component superimposed on each envelope, the amplitude of said carrier component being a minor fraction of the amplitude of said envelope, an electron tube network having its input circuit excited by the voltage output of said detector, the bias on at least one of the electrodes of said tube being such that pulses above a predetermined amplitude will drive said tube to plate-current cutoff before said pulses reach their full amplitude, whereby only the carrier component associated with envelopes which are below said predetermined amplitude will be transmitted by said tube, an amplifier tuned to the frequency of said carrier component for amplifying the carrier output of said detector, an additional detector coupled to the output of said tuned amplifier, and a signal utilization means controlled by the output of said additional detector.

8. An amplitude discriminating receiver system for pulse modulated carrier waves which comprises a first tuned amplifier for said carrier waves, a detector having means for only incompletely removing the carrier component of said waves for deriving pulse envelopes of said waves with a small carrier component on the crest portion of each of said pulse envelopes, a grid-controlled electron tube network having its grid circuit excited by the voltage output of said detector, the bias on the grid of said tube being such that pulse envelopes above a predetermined amplitude will cause said tube to operate beyond one of the bends of its grid voltage-plate current characteristic before said envelopes reach their maximum amplitudes, whereby only the carrier component on the crest of those pulse envelopes which are below said predetermined amplitude will be transmitted by said tube, a second amplifier tuned to the frequency of said carrier component for amplifying the carrier output of said detector, an additional detector coupled to the output of said second amplifier, and signal translating means controlled by the output of said additional detector.

9. An amplitude discriminating system for pulse modulated carrier waves which comprises a first tuned amplifier excited by said waves and tuned to the frequency thereof, a detector having means for only incompletely removing the carrier component of said waves for deriving negative-going pulse envelopes of said waves with a small carrier component on the crest portion of each envelope, an electron tube network having its input circuit excited by the voltage output of said detector, the bias on at least one of the electrodes of said tube being such that pulses above a predetermined amplitude will drive said tube to plate-current cutoff before said pulses reach their maximum amplitude, whereby only the carrier component on the crest of said pulse envelopes which are below said predetermined amplitude will be transmitted by said tube, a second amplifier tuned to the frequency of the carrier component for amplifying the carrier output of said tube, said second amplifier having a narrower band-pass than said first amplifier, an additional detector coupled to the output of said second amplifier, and signal translating means controlled by the output of said additional detector.

10. A system as set forth in claim 9, including means to reduce the frequency of the carrier output of said detector to a lower frequency, said second amplifier being tuned to said reduced frequency.

11. An amplitude discriminating receiver system for pulse modulated carrier waves which comprises an antenna for receiving said waves, a first detector coupled to said antenna and to a source of heterodyning oscillations for deriving pulse modulated intermediate frequency waves, a first tuned amplifier for said intermediate frequency waves, a second detector having means for only incompletely removing the intermediate frequency component for deriving negative-going pulse envelopes of said waves with a small intermediate frequency component on the crest portion of each envelope, a grid-controlled electron tube network having its grid circuit excited by the voltage output of said second detector, the bias on said grid being such that pulses above a predetermined amplitude will drive said tube to plate-current cutoff before said pulses reach their full amplitude, whereby only the intermediate frequency component on the crest of said pulse envelopes which are below said predetermined amplitude will be transmitted by said tube, a second amplifier tuned to the intermediate frequency for amplifying the intermediate frequency output of said tube, said second tuned amplifier having a narrower band-pass than said first tuned amplifier, a third detector coupled to the output of said second tuned amplifier, a clipper circuit coupled to said third detector for transmitting only voltages above a predetermined amplitude, and signal reproducing means controlled by the output of said clipper.

12. A system as set forth in claim 11, including additional heterodyne means to reduce the frequency of the intermediate frequency output of said second detector, said second tuned amplifier being tuned to said reduced frequency.

13. A receiver system for receiving desired incoming pulse modulated carrier waves of predetermined duration and amplitude in the presence of interfering pulse modulated carrier waves of greater amplitude and shorter duration, comprising a first carrier wave filter having a band pass wide enough to pass said desired and undesired carrier waves without appreciable distortion of their pulse envelopes, means including a detector coupled to said filter for deriving the pulse envelopes of said desired and undesired carrier waves and for superimposing a small component of the incoming carrier waves on the crests of said envelopes, means excited by the output of said detector to so limit the amplitude of said output that only the carrier component on the crests of envelopes derived from said desired waves of said predetermined amplitude are transmitted, a second carrier wave filter coupled to the output of said discriminating means and having a band pass which is wide enough to pass the modulation component of the waves in the output of said apparatus, and signal translating means coupled to the output of said second filter.

GEORGE W. BRYAN, Jr.

REFERENCES CITED

The following references are of record in the file of this patent:

UNITED STATES PATENTS

| Number | Name | Date |
|---|---|---|
| 1,723,440 | Ranger | Aug. 6, 1929 |
| 1,727,813 | David et al. | Sept. 10, 1929 |
| 2,061,734 | Kell | Nov. 24, 1936 |
| 2,087,288 | Landon | July 20, 1937 |
| 2,166,995 | Koch | July 25, 1939 |
| 2,194,292 | Bligh et al. | Mar. 19, 1940 |
| 2,221,795 | Haffcke | Nov. 19, 1940 |
| 2,241,170 | Ulbricht | May 6, 1941 |
| 2,258,877 | Barber | Oct. 14, 1941 |
| 2,343,115 | Noble | Feb. 29, 1944 |